United States Patent [19]

Kessler

[11] Patent Number: 4,666,323
[45] Date of Patent: May 19, 1987

[54] CAP AND BRUSH ASSEMBLY AND METHOD OF FORMING IT

[76] Inventor: Milton Kessler, 6690 Harrington Ave., Youngstown, Ohio 44512

[21] Appl. No.: 478,062

[22] Filed: Mar. 23, 1983

Related U.S. Application Data

[63] Continuation-in-part of Ser. No. 277,840, Jun. 26, 1981, abandoned.

[51] Int. Cl.⁴ .............................................. A46B 11/00
[52] U.S. Cl. ...................................... 401/129; 264/243; 264/334; 264/336; 300/21; 401/126; 425/805
[58] Field of Search ............... 401/126, 129; 425/805; 300/21; 264/243, 334, 336

[56] References Cited

U.S. PATENT DOCUMENTS

| | | |
|---|---|---|
| 2,011,545 | 8/1935 | Thorp . |
| 2,210,766 | 8/1940 | McGinnis et al. . |
| 2,558,334 | 6/1951 | Baumgartner . |
| 2,582,721 | 1/1952 | Roshkind . |
| 2,583,441 | 1/1952 | Palmer .......................... 264/336 X |
| 2,681,463 | 6/1954 | Gordon . |
| 2,904,837 | 9/1959 | Crabble . |
| 2,990,076 | 6/1961 | Stull . |
| 3,087,191 | 4/1963 | Plunkett . |
| 3,092,440 | 6/1963 | Rex et al. ..................... 264/334 X |
| 3,311,941 | 4/1967 | Buchwalter et al. . |
| 3,325,576 | 6/1967 | Kessler . |
| 3,337,668 | 8/1967 | Mohle ............................ 264/334 X |
| 3,612,325 | 10/1971 | Williams . |
| 3,618,154 | 11/1971 | Muhler et al. . |
| 3,669,598 | 6/1972 | Tucker .......................... 264/334 X |
| 3,861,549 | 1/1975 | Watson et al. . |
| 3,958,944 | 5/1976 | Wong . |
| 4,126,291 | 11/1978 | Gilbert et al. . |
| 4,244,076 | 1/1981 | Meyer ............................. 264/243 X |

FOREIGN PATENT DOCUMENTS

| | | |
|---|---|---|
| 1174544 | 3/1959 | France . |
| 4629989 | 8/1971 | Japan . |
| 362261 | 12/1931 | United Kingdom . |

Primary Examiner—Steven A. Bratlie
Attorney, Agent, or Firm—Browdy and Neimark

[57] ABSTRACT

A container closure includes a cap for sealing a container against leakage, and a brush for spreading contents of the container. The cap includes a top wall, an internally threaded skirt depending from perimetrical portions of the top wall, and a stem depending from a central portion of the top wall. The brush includes a plurality of bristles having (1) mounting portions which are secured to the lower end region of the stem, and (2) applicator portions which depend below the stem for brushing the contents of the container onto a surface. The cap is a one-piece structure having its brush-supporting stem formed integrally with other parts of the cap. A method of forming the assembly includes the steps of molding the cap using a specially configured mold which has at least three relatively movable parts for defining a mold cavity and for effecting a pop-off type of ejection of the threaded cap from the mold once the integral cap and stem having been molded, whereafter the brush bristles are inserted into or otherwise secured to the cap's stem.

3 Claims, 7 Drawing Figures

CAP AND BRUSH ASSEMBLY AND METHOD OF FORMING IT

CROSS-REFERENCE TO RELATED APPLICATIONS AND RELEVANT PATENT

The present application is a continuation-in-part of application Ser. No. 277,840, filed June 26, 1981, entitled CAP AND BRUSH ASSEMBLY AND METHOD OF FORMING IT, hereinafter referred to as the "Parent Case," now abandoned in favor of the present application. Reference is also made to the following applications and patent:

CAP AND BRUSH ASSEMBLY, Ser. No. 136,905, filed Apr. 3, 1980 by Robert J. Williams, hereinafter referred to as the "Plural-Part Cap Assembly Case," now abandoned;

ONE-PIECE CAP AND BRUSH AND METHOD OF FORMING IT, Serial No. (Docket No. 2-075) filed concurrently herewith by Milton Kessler as a continuation-in-part of application Ser. No. 277,843, filed June 26, 1981, entitled ONE-PIECE CAP AND BRUSH AND METHOD OF FORMING IT, these applications being hereinafter referred to collectively as the "One-Piece Cap and Brush Case," the disclosures of which are incorporated herein by reference; and, METHOD OF MAKING UNITARY PLASTIC SEALING CAP, U.S. Pat. No. 3,325,576, issued June 13, 1967, to Milton Kessler, hereinafter referred to as the "Pop-Off Molding Method Patent," the disclosure of which is incorporated herein by reference.

BACKGROUND OF THE INVENTIOn

1. Field of the Invention

The present invention relates to container closures having a capability for spreading contents of the container and, more particularly, to a container closure including a one-piece cap having a brush-supporting stem formed integrally with other parts of the cap, and to a method of forming a cap and brush assembly.

2. Prior Art

Various types of container closures suitable for sealing container contents against leakage and having a brush secured thereto for spreading container contents are known. Substances such as rubber cement, certain types of ink, correction fluid for covering typing errors, and the like are particularly useful when the caps which seal their containers carry brushes for distributing the substances.

Most prior proposals for cap and brush assemblies have called for the stem of the brush to be formed as a part which is separate from the cap. Forming a brush stem separately from a cap and then assembling these parts as by gluing, welding, pressing or other known connection techniques have added significantly to the cost of cap and brush assemblies. Another problem associated with two-piece cap and stem structures has been the tendency of the stem to separate from the cap when the stem and brush are being pulled out of a bottle wherein the liquid contained within the bottle has set-up slightly or otherwise increased in viscosity.

The referenced Plural-Part Cap Assembly Case discloses such a two-piece arrangement. While the type of connection utilized in the referenced patent represents a significant advance in providing a cap and brush assembly with a secure connection between a cap and a brush stem, the cost of separately forming cap and brush stem components, and the cost of assembling these components in accordance with this proposal is still higher than desired.

To the degree that proposals have been made for forming a cap and an elongate applicator as an integral structure, the types of structures which have been proposed have been suitable for formation only with an unscrewing type mold which includes a complex assembly of parts for threading a molded cap and applicator structure off of the mold once the molded structure has been formed. Limitations imposed on the configurations of such structures as can be molded where there is a need to unscrew the resulting molded structures from the mold have not permitted a desirable type of integral cap and applicator to be formed. Moreover, unscrewing-type molds are undesirable in view of their excessively high cost.

3. The One-Piece Cap and Brush Case

The referenced One-Piece Cap and Brush Case represents a refinement of the present invention and does not constitute prior art to the present invention. In accordance with the improvement described in the One-Piece Cap and Brush Patent, brush bristles are formed as integral parts of the brush stem.

SUMMARY OF THE INVENTION

The present invention addresses the foregoing and other drawbacks of the prior art, and provides a novel and improved container closure suitable for sealing a container against leakage and having a one-piece construction which includes an integrally formed brush stem for carrying brush bristles to spread container contents. The one-piece cap and brush stem construction has desirable qualities of reduced manufacturing expense, ease of assembly, and strength of construction. The one-piece cap and brush stem structure of the present invention assures that the brush stem does not separate from the remainder of the cap, as is commonplace with many two-piece cap and brush stem assemblies.

A further feature of the invention lies in the provision of a method for forming a one-piece cap and brush stem structure. Prior to the present invention, it had long been agreed by those skilled in the art to which the present invention pertains that the only reasonable method of forming cap and brush stem assembly of the type used with typewriter correction fluid containers was to form the cap and brush stem separately. The present invention has proven prior thinking to have been in error.

The method of the present invention utilizes features of a pop-off molding technique which technique is described in the referenced Pop-Off Molding Method Patent. The referenced patent describes the use of either or both of an extensible rim-engaging ejector sleeve and an extensible center ram, which extensible parts are relatively movable with respect to other parts of a mold to effect a pop-off type of removal or ejection of a molded cap from its mold. The method of the present invention preferably utilizes one or both of these types of relatively extensible mold parts to effect removal or ejection of an integrally formed cap and applicator structure from its mold.

The foregoing and other features and advantages, and a fuller understanding of the invention, may be had by referring to the following description and claims, taken in conjunction with the accompanying drawings.

DESCRIPTION OF THE PREFERRED EMBODIMENT

Figure 1:
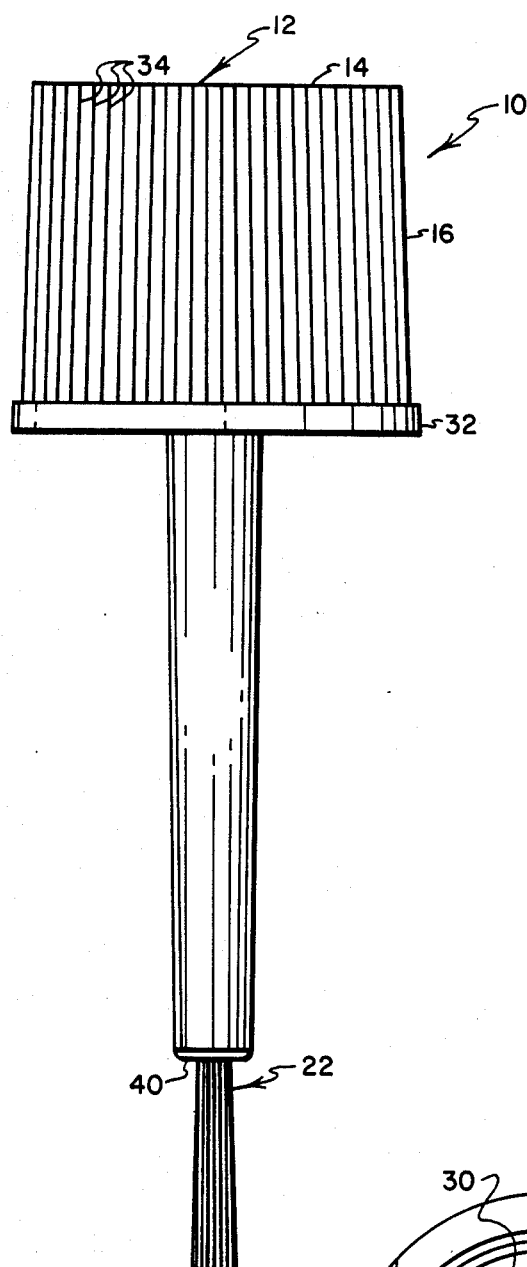
FIG. 1 is a side elevational view, on an enlarged scale, of a cap and brush assembly embodying features of the present invention.
Figure 3:
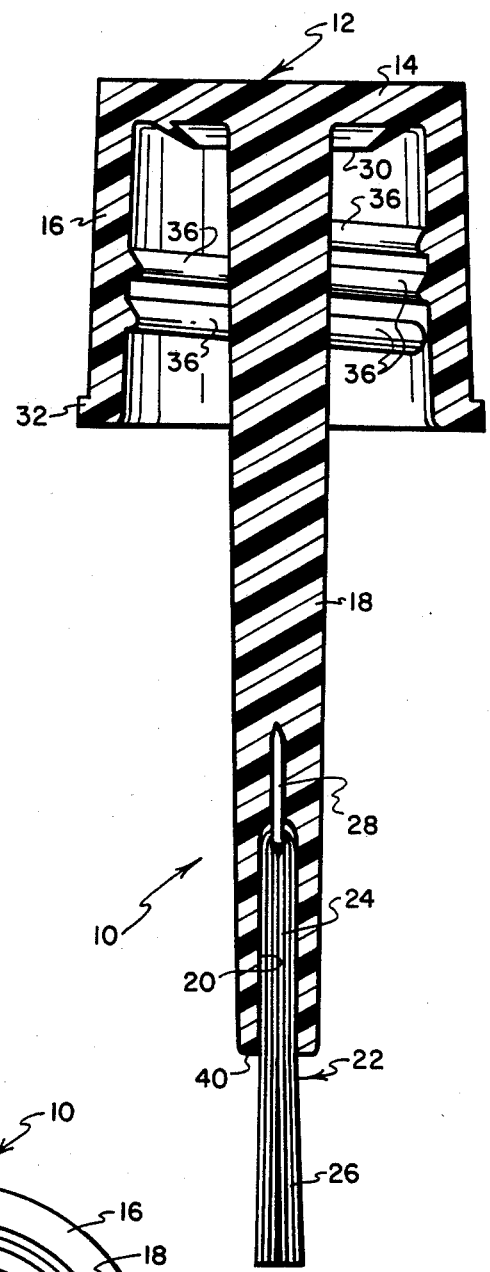
FIG. 3 is a sectional view as seen from a plane indicated by a line 3—3 in FIG. 2.
Figure 2:
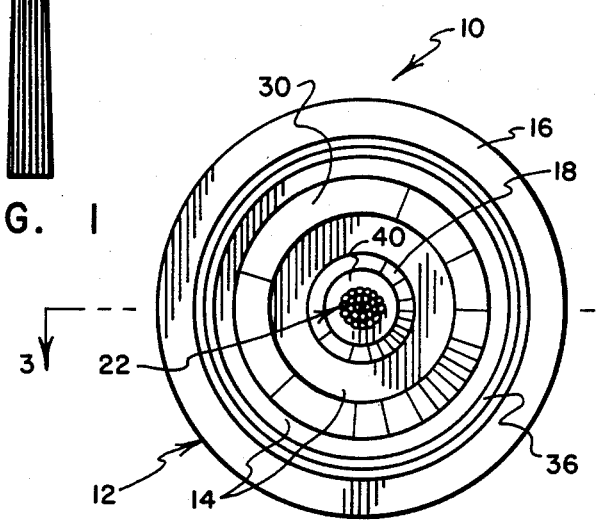
FIG. 2 is a bottom plan view of the cap and brush assembly of FIG. 1.

Referring to FIGS. 1-3, a cap and brush assembly embodying features of the present invention is indicated generally by the numeral 10. The components of the assembly 10 include a one-piece, integrally formed cap and stem structure 12 having a top wall 14, an annular skirt 16 depending from the perimeter of the top wall 14, and a thin elongate stem 18 depending from central portions of the top wall 14. An opening 20 is formed in the bottom end of the stem 18.

Brush bristles 22 are carried by the lower end region of the stem 18. Each of the bristles 22 has U-shaped mounting portions 24 which extend inside the opening 20, and applicator portions 26 which depend below the bottom end of the stem 18. A U-shaped staple 28 is hooked through the U-shaped mounting portions 24 of the bristles 22 and secures the bristles 22 on the stem 18.

The top wall 14 is of generally disc-like configuration. Referring to FIG. 3, a sealing formation 30 of relatively thin, pliable material is formed integrally with the top wall 14 and depends therefrom so as to encircle the upper end region of the stem 18. The sealing formation 30 is configured such that, when the cap assembly 10 is installed on the neck of a conventional container (not shown), the upper end of the container's neck will engage and compress the sealing formation 30 so that a secure, liquid-tight seal is formed between the cap assembly 10 and the container.

Referring to FIG. 1, the skirt 16 has a circumferential flange or rim 32 formed near its lower end, and has upwardly extending ribs 34 formed on its outer surface. The flange 32 and the ribs 34 cooperate to provide a surface which can be readily gripped by the fingers of one's hand to facilitate rotating the cap assembly 10 relative to a container on which the cap assembly 10 is installed.

Referring to FIG. 3, a plurality of helical threads 36 are formed on the inner surface of the skirt 16 and are arranged to cooperate with such threads as may be formed on an external surface of a container neck (not shown) to permit the cap assembly 10 to be tightly secured on the container neck.

The stem 18 is tapered along its length. The bottom end of the stem 18 has an end surface 40 which extends transverse to the axis of the elongate stem 18. The opening 20 is formed substantially centrally with respect to the end surface 40 and extends coaxially along the axis of the elongate stem 18. The opening 20 is shown as having a substantially constant diameter which will permit the mounting portions 24 of the bristles 22, together with the staple 28 to be inserted therein. No "pilot" holes are provided at the end of the opening 20 for receiving the legs of the staple 28; rather, the legs of the staple 28 are pressed into such solid portions of the stem 18 as are located above the end of the opening 20.

The method utilized to form the cap and brush assembly 10 includes the steps of molding the one-piece cap and stem structure 12, and then installing the bristles 22 onto the stem 18 by pushing the bristle portions 24 and the staple 28 into the opening 20 and into place as shown in FIG. 3.

Figure 4:
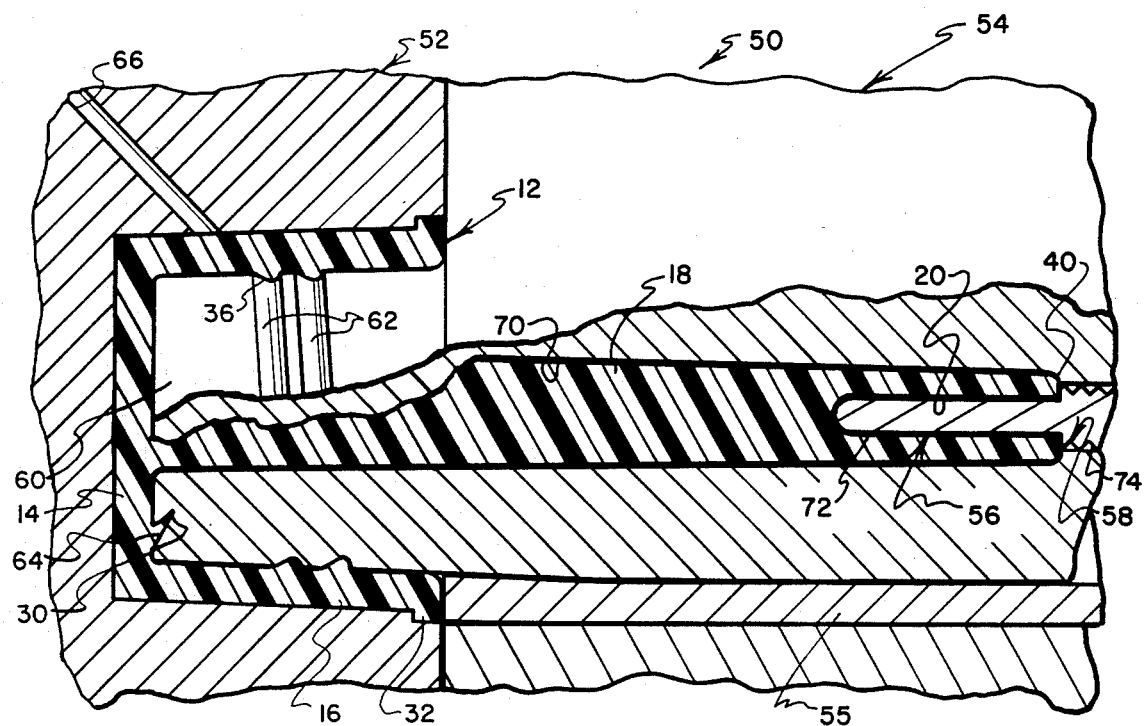
FIG. 4 is a side elevational view of portions of a plural-piece mold used to form the cap and stem member used in the assembly of FIGS. 1-3, with parts of the mold pieces being broken away and shown in cross-section, and with portions of a cap and stem member being shown in cross-section inside the cavity defined by the mold.
Figure 5:
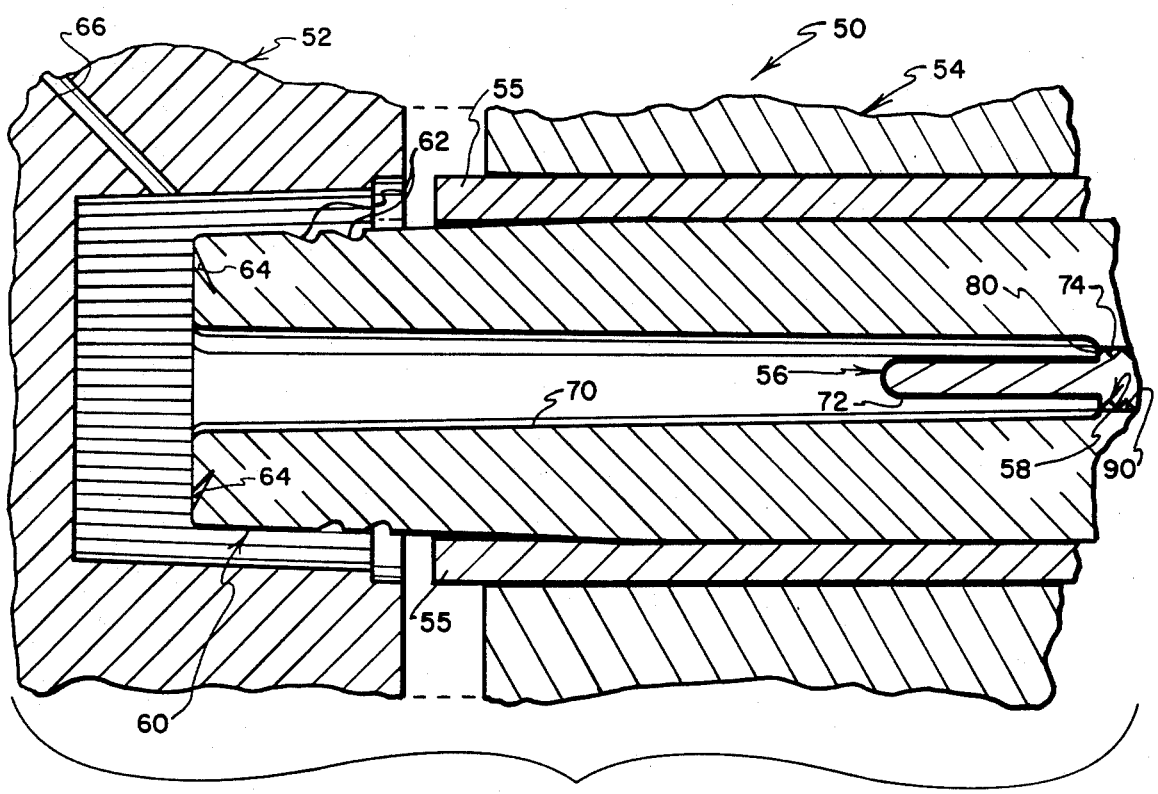
FIG. 5 is a cross-sectional view of the mold of FIG. 4 with the relatively movable pieces of the mold separated, and with an ejector sleeve moved to an extended position to illustrate how it operates to effect a pop-off type of removal of a molded cap and stem member from the mold.

Referring to FIGS. 4 and 5, a plural-part mold is indicated generally by the numeral 50. Referring to FIGS. 4-7, the mold 50 includes a cavity half 52, a core half 54, an ejector sleeve 55, and a pin member 56 which is permanently pressed into a hole 58 formed in the core half 54.

The cavity half 52 and the core half 54 cooperate to define a cavity for molding the cap's top wall 14 and skirt 16. The core half 54 has a member 60 which projects into the cavity half. Thread formations 62 are provided on the member 60 to mold the threads 36. A groove formation 64 is provided on the member 60 to mold the sealing formation 30.

The ejector sleeve 55 surrounds the member 60, as is best seen in FIG. 5, and is movable relative to the remainder of the elements of the core half 54, as illustrated in FIG. 5, to effect a pop-off type of removal or ejection of a molded cap and stem structure 12 from engagement with the core half 54 once the mold halves 52, 54 have been opened and separated following molding of a cap and stem structure 12. The use of an ejector sleeve 55 to effect a pop-off type of removal of a molded cap from a mold is described in detail in the referenced Pop-Off Molding Method Patent, the disclosure of which is incorporated herein by reference.

A tapered hole 70 extends through the core half 54 to define a cavity portion for molding the stem 18. The pin member 56 has an end portion 72 which extends into the tapered hole 70 for molding the stem opening 20. A gate passage 66 is formed in the cavity half 52 for introducing plastics material in a molten state into the cavity defined by the mold parts 52, 54, 55, 56 for molding the cap and stem member 12.

Figure 6:
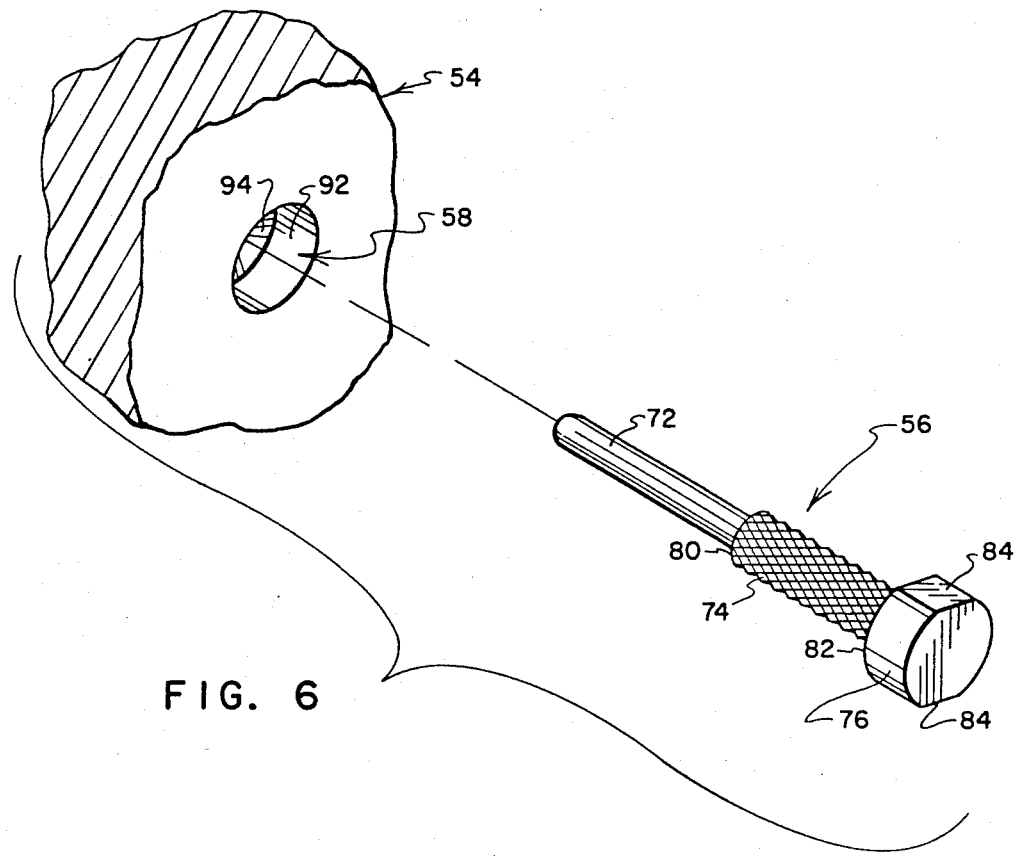
FIG. 6 is an exploded perspective view, on an enlarged scale, showing one of the mold pieces in its entirety, and showing only a part of one of the other mold pieces; and, FIG. 7 is a sectional view showing the mold pieces of FIG. 6 in their assembled configuration.
Figure 7:
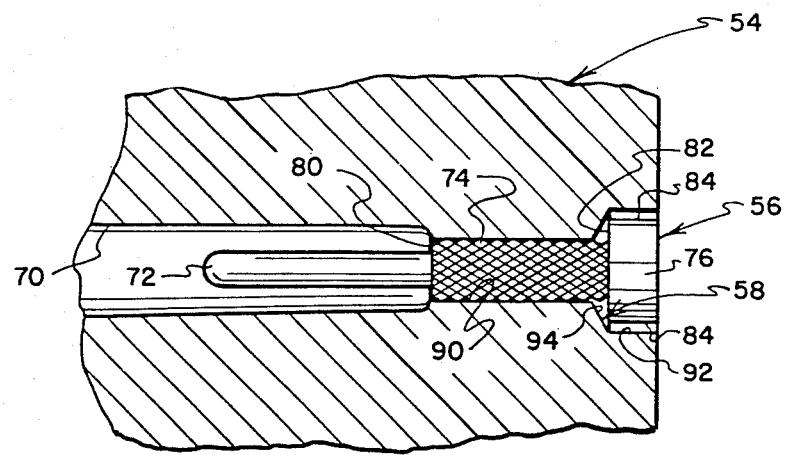

Referring to FIGS. 6 and 7, the pin 56 and the hole 58 are specially configured to provide a vent which will let gases escape from the tapered hole 70 as plastics material flows along the hole 70 to form the stem 18. The pin 56 has radially extending shoulders 80, 82 which define transitions between mold, central and head portions 72, 74, 76 which are each of progressively larger diameter. The central portion 74 has a knurled outer surface. The head portion 76 has a pair of flats 84 formed on its opposite sides.

Referring to FIG. 7, the hole 58 is coaxial with the hole 70 and has constant diameter inner and outer portions 90, 92 separated by a tapered portion 94. The inner portion 90 has a diameter which will receive the knurled surface 74 of the pin 56 in a press fit, yet which will let gases filter along the pin 56 through passages defined by the grooves of the knurled surface 74. The tapered portion 94 and the shoulder 82 cooperate to define a passage therebetween which permits gases to travel from the hole portion 90 to the hole portion 92. The flats 84 enable gases to escape through the hole portion 92.

In operation, the mold parts 52, 54, 55, 56 are positioned as shown in FIG. 4 to mold a cap and stem assembly 12. Molten plastics material is injected into the mold cavity through the gate passage 66. As the plastics material fills the cavity and travels along the hole 70 to form the stem 18, such gases as may have been trapped in the hole 70 escape along the pin 56 by virtue of the venting arrangement described previously. Once a cap and stem assembly 12 has been molded, the mold halves 52, 54 are separated, as shown in FIG. 5, the cap portion is ejected or "popped off" of the mold member 60 by effecting movement of the ejector sleeve 55 to engage the rim 32 of the cap and stem structure 12 in the manner described in the referenced Pop-Off Molding Method Patent, whereby the stem portion 18 is pulled out of the hole 70 and off of the pin 56.

As will be apparent from the foregoing, the present invention represents a significant step forward in the provision of cap and brush assemblies of the general type used on container typing correction fluid. By integrally forming cap and stem parts of a cap and brush assembly, considerable savings in molding and assembly costs result, as does an improved product.

While the pin 56 has been described, in its preferred form, as being configured to form a substantially constant diameter hole into which the brush bristles 22 can be installed, it will be understood that the pin 56 can be configured, instead, to form a slot-like opening (not shown) or openings of other configurations which can receive the brush bristles 22.

While the brush bristles 22 have been described as being of generally U-shaped configuration and held in place by a staple, it will be understood that bristles of other configurations and/or other fastening techniques such as bonding, gluing and the like can also be utilized. Moreover, a paddle-shaped wiper (not shown) may be used in place of the bristles 22 where such a wiper will serve to effectively spread container contents.

While the preferred material from which the cap and stem member 12 is formed is a plastics material such as polypropylene, other plastics materials such as polyethylene may be used. While the staple 28 is preferably formed from steel, other rigid materials may also be used. While the bristles 22 are preferably formed from polypropylene, other conventional brush materials may also be used.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A method of forming an internally threaded cap and brush assembly for closing a container and for spreading liquid contents of the container, the assembly having an integrally formed, one-piece cap and elongate stem member, and bristles secured thereto to form a brush, the method comprising the steps of:
    (a) providing a mold having at least three relatively movable mold parts which cooperate to define a cavity configured to form a one-piece cap and elongate stem member which includes:
        (i) a top wall;
        (ii) an annular skirt depending from the top wall and formed integrally therewith, the skirt having threads formed on its inner surface, and a bottom edge;
        (iii) an elongate stem member tapering from a largest diameter at its top to a smallest diameter at its bottom, said elongate stem member depending from central portions of the top wall along a central axis of the mold cavity and formed integrally with the top wall;
        (iv) formation means on the stem including an elongated cavity for receiving bristle means;
    said movable parts including a first female part for forming said top wall and the exterior of said annular skirt; a second male part which is movable along the central axis relative to said female part and which forms the interior of said annular skirt including said threads, said second male part having an elongated tapered opening therein for the formation of said elongate stem; a third mold part of elongated annular configuration adjacent to and surrounding said second male part, and having an end for forming the bottom edge of said annular skirt, and third past being movable relative to said second male part to serve as pop-off means; and a pin-shaped member to form the formation means on the elongate stem member of said cap and brush, said pin-shaped member including a central part for anchoring said pin-shaped member in said second male part, and an elongated core projecting from said central part inwardly into the elongated tapered opening of said second male mold part so as to form said formation means in the form of an elongated cavity extending upwardly from the bottom of said elongate stem member, said elongated cavity extending to a height of less than half the length of said elongate stem member;
    (b) injecting molten plastic material into the mold cavity to form the cap and elongate stem member with an elongated cavity therein;
    (c) removing the cap and elongate stem member from the mold cavity by moving said first female mold part and said second male part along the central axis relative to one another, and moving said third annular mold part relative to said second male mold part along the central axis against the one-piece cap and elongate stem member to pop the threaded skirt off the second male mold part; and
    (d) installing bristle means on the elongate stem member by positioning mounting portions of the bristle means in the elongated cavity of the formation means, and arranging other portions of the bristle means to extend away from the formation means to form a brush at the bottom end of the elongate stem member.

2. A method according to claim 1 wherein said pin-shaped member to form the elongated cavity in said tapered elongate stem member comprises a central portion recessed within said second male part, the method further comprising providing a vent along said central part of said pin-shaped member for permitting gases to escape from the mold cavity as molten plastic material is injected therein.

3. A method according to claim 2, wherein the vent is provided in the form of a knurled surface on said central portion.